United States Patent [19]

Jann et al.

[11] Patent Number: 5,053,727
[45] Date of Patent: Oct. 1, 1991

[54] CIRCUIT COUPLING AN OSCILLATOR TO AN ELECTRICAL LOAD

[75] Inventors: Wolfango Jann, Buckenhof; Kurt Rottner, Erlangen, both of Fed. Rep. of Germany

[73] Assignee: Siemens Aktiengesellschaft, Munich, Fed. Rep. of Germany

[21] Appl. No.: 512,469

[22] Filed: Apr. 23, 1990

[30] Foreign Application Priority Data

May 3, 1989 [EP] European Pat. Off. ........ 89108061.6

[51] Int. Cl.$^5$ ...................... H03K 3/16; H02M 3/338; H03L 3/00
[52] U.S. Cl. ......................................... 331/62; 331/75; 331/112; 363/61
[58] Field of Search ...................... 331/62, 74, 75, 112; 363/59, 60, 61

[56] References Cited

U.S. PATENT DOCUMENTS

| | | |
|---|---|---|
| 2,842,669 | 7/1958 | Thomas . |
| 2,896,146 | 7/1959 | Jenkins . |
| 3,581,098 | 5/1971 | Hoover .......................... 250/213 VT |
| 3,723,899 | 3/1973 | McClaskey ...................... 333/103 X |
| 3,917,268 | 11/1975 | Tingey et al. ................... 331/112 X |
| 4,443,719 | 4/1984 | Planer et al. ...................... 363/60 X |

FOREIGN PATENT DOCUMENTS 3420033 12/1985 Fed. Rep. of Germany .
2033004 11/1970 France .

OTHER PUBLICATIONS

Otto Limann, "Elektronik Ohne Ballast: Einfuhrung in die Schaltungstechnik der Industriellen Elektronik"; 5., verb. u. erw. Aufl., Munchen: Franzis-Verlag, 1978, pp. 147-186.

Primary Examiner—Siegfried H. Grimm
Attorney, Agent, or Firm—Hill, Van Santen, Steadman & Simpson

[57] ABSTRACT

A circuit comprising an oscillator having a load coupled thereto by means of at least one voltage-dependent coupling element that exhibits a high impedance at relatively low voltages and low impedance at relatively higher voltages. The voltage-dependent coupling element can comprise two series connected Zener diodes connected such that the anodes of the diodes are coupled together. The voltage-dependent coupling element can also comprise a varistor.

5 Claims, 1 Drawing Sheet

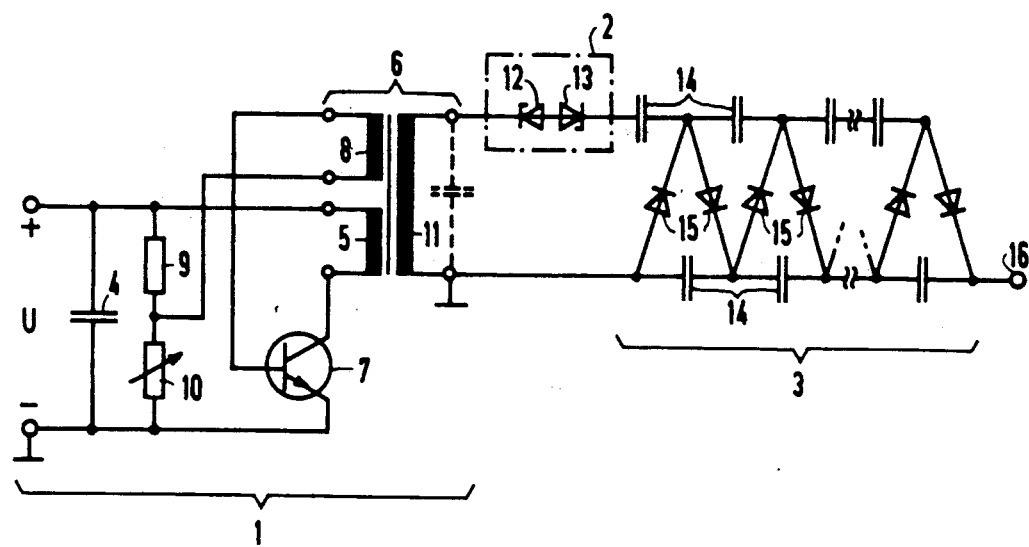

CIRCUIT COUPLING AN OSCILLATOR TO AN ELECTRICAL LOAD

BACKGROUND OF THE INVENTION

The present invention is directed to oscillators. More particularly, the invention is directed to an oscillator having an electrical load coupled thereto.

Oscillators having an electrical load coupled thereto are described in a book by Otto Limann, "Elektronik ohne Ballast," Franzis-Verlag GmbH, 1978, at pages 147-151. At pages 162, 163, and 175 of the book, a voltage multiplier circuit in a high-voltage supply for an x-ray image intensifier is described. This multiplier circuit is an example of an electrical load that can be coupled to an oscillator.

Often, the starting phase in an oscillator, or resonant circuit, is more critical than the steady state phase, i.e., maintenance of oscillation, once the oscillator has been started. This is particularly true when circuit loading by the electrical load is greater during the start up phase than during steady state phase. In this situation, the oscillator can start up poorly or not at all.

A situation where the oscillator starts up poorly can occur when a voltage multiplier circuit is coupled as an electrical load to the oscillator. The current required for charging capacitors of the high-voltage cascades of the voltage multiplier circuit is drawn away from the oscillator during the start up and stimulation phase. As a result, a reliable and fast stimulation of oscillations is not guaranteed.

SUMMARY OF THE INVENTION

The present invention provides an oscillator that easily starts-up and stimulates oscillations even when an electrical load is coupled thereto.

To this end, the invention provides that a load is coupled to an oscillator via at least one voltage-dependent coupling element that reduces or precludes current drain from the oscillator to the load until the voltage of an output of the oscillator is sufficiently great.

In an embodiment, the invention provides that an electrical load be coupled to an oscillator via at least one voltage-dependent impedance element that exhibits high impedance at low voltages and low impedance at high voltages. As a result, load current cannot flow until the oscillator has started.

In an embodiment, the voltage-dependent coupling element used to couple the load to the resonant circuit of the oscillator comprises two Zener diodes connected in series and with the anodes thereof coupled together. For example, given an x-ray image intensifier voltage supply, the Zener diodes can be connected in series between the high voltage cascade of the high voltage multiplier of the supply and the oscillator. Since the anodes of the Zener diodes are coupled together, the cathode of one diode is coupled to the oscillator while the cathode of the other diode is coupled to the voltage multiplier. The Zener diodes do not become conductive until the oscillator has started up and has stimulated oscillations to the extent that the peak voltage at the resonant circuit is as least as great as the avalanche-breakdown voltage of the diodes.

Given, for example, the use of a high voltage cascade as an electrical load coupled to an oscillator, only that amount of energy for charging the cascade can be drawn from the resonant circuit as can be resupplied while simultaneously maintaining the oscillatory peak voltage that is equal to the avalanche-breakdown voltages of the two Zener diodes. Thus, oscillation no longer ceases due to the connection of the load. Further, the Zener diodes conduct after every elevation of the cascade charging up to the complete charging of the cascade and remain open only when the oscillatory peak voltage is greater than the breakdown voltage and cascading charging voltage at the cascade input until the output voltage of the cascade has reached its ultimate value. The cascade is thereby charged without affecting start up of the oscillator.

The above-described arrangement is far more advantageous than coupling an oscillator to an electrical load via a normal, current limiting voltage-independent resistor as described at page 175 of the aforementioned book of Otto Limann. This is because the internal resistance of the entire circuit does not increase toward the output due to the use of a resistor as the coupling element.

In contrast, the internal resistance is hardly increased at all. In the start up phase, however, a high impedance coupling is provided by the Zener diodes because they are initially non-conductive.

In another embodiment, instead of the two Zener diodes, a varistor that is connected between the oscillator and the electrical load can also be used as a voltage-dependent coupling element.

An advantage of the invention is an improved coupling of the electrical load to an oscillator.

Another advantage of the invention is reliable start up of an oscillator having an electrical load coupled thereto.

Another advantage of the invention is the elimination o overdrawing of current away from an oscillator during start up.

These and other advantages and features of the invention will become clear with reference to the following detailed description of the presently preferred embodiments and accompanying drawings.

BRIEF DESCRIPTION OF THE DRAWING

The only figure is a schematic circuit diagram illustrating coupling of an oscillator to an electrical load via a voltage-dependent coupling element.

DETAILED DESCRIPTION OF THE PRESENTLY PREFERRED EMBODIMENTS

In accordance with the invention, an electrical load is coupled to an oscillator by means of the voltage-dependent coupling element such as e.g., a Zener diode arrangement or a varistor. The coupling element exhibits high impedance at low voltages and low impedance at high voltages so that current is not drawn from the oscillator during start up of the oscillator. As a result, sufficient current is available to the oscillator during start up to ensure a reliable start up of the oscillator.

In the figure, it is illustrated that an oscillator 1 is connected via a voltage-dependent coupling element 2 to a load 3. The load 3 comprises a high-voltage cascade for a high-voltage supply of an x-ray image intensifier. The oscillator 1 has supplied to its input a direct current operating voltage U. A capacitor 4 is coupled across the input of the oscillator to smooth out ripples in the voltage supply. As a result, a smooth direct current voltage is supplied to the oscillator.

The voltage U is supplied to a first primary winding 5 of an oscillatory transformer 6 of a resonant circuit. A second terminal of the first primary winding 5 is connected to ground via a transistor 7. A negative feedback of the resonant circuit required for the creation of oscillations is provided via a second primary winding 8 which has one terminal connected to the base of the transistor 7. A second terminal of the second primary winding 8 is connected to a voltage divider, which divider comprises a resistor 9 and a variable resistor 10. The secondary winding 11 of the oscillator transformer 6 provides the output of the oscillator The electrical load comprising the high voltage cascade is connected to the output of the oscillator 1 by means of the voltage-dependent coupling element 2. As illustrated, the voltage-dependent coupling element 2 comprises two Zener diodes 12 and 13 that are connected in series such that the cathodes are oppositely directed, i.e., the anodes are coupled together, one cathode being coupled to the output of the oscillator 1, the other cathode being coupled to the input of the electrical load 3. Due to the series connection of the oppositely directed Zener diodes 12 and 13, current can flow only when the output voltage of the oscillator 1 is greater than the avalanche-breakdown voltages of the two Zener diodes 12 and 13. As a result, a current that effects a charging of the high-voltage cascade 3 can only flow when the Zener diodes 12 and 13 are conducting.

As illustrated, the high voltage cascade 3 comprises capacitors 14 and diodes 15 coupled together in the known manner. When current is permitted to flow through the Zener diodes 12 and 13, a high DC voltage that, for example, can be employed as an operating voltage for an x-ray image intensifier and the electrodes thereof is provided at an output 16 of the high voltage cascade 3.

All components that exhibit a high impedance resistance at low voltages and that exhibit a low impedance at high voltages can be employed as a voltage-dependent coupling element 2. For example, a voltage-dependent resistor often referred to as a varistor, can be employed for this purpose. Alternatively, switch means that, for example, is controlled by a threshold switch that couples the electrical load to the output of the oscillator when a pre-selected threshold voltage is exceeded can also be employed.

It should be understood from the foregoing that an oscillator that can easily start up and stimulate oscillations is provided on the basis of the use of the voltage dependent coupling element connection since the electrical load is not connected to the oscillator until the oscillator reaches steady state.

While a preferred embodiment has been shown, modifications and changes may become apparent to those skilled in the art which shall fall within the spirit and scope of the invention. It is intended that such modifications and changes be covered by the attached claims.

We claim:
1. A circuit comprising:
   an oscillator;
   an electrical load; and
   at least one electronic voltage-dependent coupling element coupling said load to said oscillator that exhibits relatively high impedance at relatively low voltages and relatively low impedance at relatively higher voltages, said voltage-dependent coupling element comprising two Zener diodes connected back-to-back and in series such that for each polarity of voltage of said oscillator said voltage-dependent coupling element prevents current flow at voltages below breakdown voltages of said Zener diodes.

2. The circuit of claim 1, wherein said voltage-dependent coupling element comprises two Zener diodes connected in series such that anodes of said Zener diodes are coupled together, one cathode being coupled to said oscillator, another cathode being coupled to said electrical load.

3. A circuit comprising:
   an oscillator;
   an electrical load; and
   at least one electronic voltage-dependent coupling element coupling said load to said oscillator that exhibits relatively high impedance at relatively low voltages and relatively low impedance at relatively higher voltages, wherein said voltage-dependent coupling element comprises a varistor.

4. A circuit comprising:
   an oscillator;
   an electrical load; and
   at least one electronic voltage-dependent coupling element coupling said load to said oscillator that exhibits relatively high impedance at relatively low voltages and relatively low impedance at relatively higher voltages, wherein said electrical load comprises an x-ray image intensifier voltage supply.

5. The circuit of claim 1, wherein said voltage-dependent coupling element decouples said electrical load from said oscillator at relatively low voltages and couples said electrical load to said oscillator at relatively high voltages.

* * * * *